(12) United States Patent
Ledbetter et al.

(10) Patent No.: US 8,519,660 B1
(45) Date of Patent: Aug. 27, 2013

(54) PORTABLE RACKING TOOL FOR ELECTRIC EQUIPMENT REPLACEMENT AND METHOD FOR REPLACING ELECTRICAL COMPONENTS

(76) Inventors: Ashley Sue Ledbetter, Argyle, TX (US); Finley Lee Ledbetter, Argyle, TX (US)

( * ) Notice: Subject to any disclaimer, the term of this patent is extended or adjusted under 35 U.S.C. 154(b) by 350 days.

(21) Appl. No.: 13/047,350

(22) Filed: Mar. 14, 2011

Related U.S. Application Data (63) Continuation-in-part of application No. 12/563,027, filed on Sep. 18, 2009, now Pat. No. 8,261,433.

(51) Int. Cl.
   *G05B 11/01* (2006.01)
   *B60R 1/072* (2006.01)
(52) U.S. Cl.
   CPC ................... B60R 1/072 (2013.01)
   USPC ........... 318/671; 318/560; 318/255; 318/256; 318/257
(58) Field of Classification Search
   CPC ....................................................... B60R 1/072
   USPC .................................. 318/671, 560, 255–257
   See application file for complete search history.

(56) References Cited

U.S. PATENT DOCUMENTS

| | | | |
|---|---|---|---|
| 5,397,869 A | 3/1995 | Huen | |
| 5,453,587 A | 9/1995 | Hurley et al. | |
| 5,465,031 A | 11/1995 | Nilssen | |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 * | 3/2006 | Vaill et al. .................. | 200/50.24 |
| 2005/0194243 A1 | 9/2005 | Prineppi | |

* cited by examiner

*Primary Examiner* — Eduardo Colon Santana
*Assistant Examiner* — David Luo
(74) *Attorney, Agent, or Firm* — Gardere Wynne Sewell LLP (57) ABSTRACT

An electrical device removal tool for electrical equipment, such as circuit breakers, is disclosed herein. The tool can be lightweight, portable, and rugged for providing electrically operated controlled insertion and removal of the electrical equipment by an operator from a remote location using a coupling device engaged with the electrical equipment housing.

16 Claims, 8 Drawing Sheets

PORTABLE RACKING TOOL FOR ELECTRIC EQUIPMENT REPLACEMENT AND METHOD FOR REPLACING ELECTRICAL COMPONENTS

CROSS REFERENCE TO RELATED APPLICATIONS

The present application is a continuation-in-part of co-pending U.S. patent application Ser. No. 12/563,027 filed on Sep. 18, 2009, entitled "Portable Racking Tool For Electric Equipment Replacement And Method For Replacing Electrical Components", which is incorporated herein in its entirety.

FIELD

The present embodiments generally relate to a portable, easy to move tool usable for electrical equipment to charge, close, or trip individual electrical units in a facility, such as a hospital or a power plant.

BACKGROUND

A need exists for a lightweight, portable tool that can prevent harm to humans in a facility that has electrical equipment in need of replacement that is susceptible to arcing during testing, maintenance, or replacement.

A need exists for a tool that can be lifted by a single hand and used for performing maintenance or replacement of electrical equipment, such as in a circuit breaker room, on a piece-by-piece basis, without shutting down power to the entire facility. Facilities operating critical equipment using electricity, such as hospitals, hotels, and other facilities, can use the tool without ceasing operation of the critical equipment.

Large facilities, such as hospitals or hotels, often have to shut down all power in the facility for a substantial time period, such as up to 2 hours, in order to replace circuit breakers and to perform manual electrical equipment maintenance in a switching room. Hotels often shut down the power during normal sleeping hours, such as between 3:00 AM and 4:30 AM, at least once a year to replace used or worn equipment. As such, guests at these hotels, such as pilots, that need to be up at 4:00 AM, will not stay at the hotel that night, causing a loss of revenue.

Also, hospitals that need to perform a similar shut down of power to prevent arcing that can occur when power is not shut down need to provide back-up power to emergency rooms, life support facilities, and intensive care units, such as where patients are on breathing machines. The time, scheduling, and costs involved in such a shut down can be immense, and if something goes wrong, a patient's life can be lost.

Without shutting down the power, switching rooms can generate "arcs" of electricity that can cause burns to any human in proximity, such as to an operator manually working on the electrical equipment. A need has long existed for a tool that can be operated by a person without needing to shut down a facility to replace circuit breakers or similar arc producing equipment.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments, and that the embodiments can be practiced or carried out in various ways.

The present embodiments relate to a racking tool, which can be a portable racking tool, such as one for removing circuit breakers in a switch room of a hospital. The racking tool can be used to remove or install electrical equipment surrounded by a metal surface.

The electrical equipment can be a low voltage circuit breaker, a medium voltage circuit breaker, a switch gear, a motor control center, a contactor, or the like.

The racking tool can enable operators to operate on electrical equipment without the need to wear the typical inch-thick full body arc flash hazard suits.

The racking tool can allow an owner to more easily maintain, clean, and lube equipment in an electrical room, without needing to shut down the entire facility during such maintenance.

The racking tool can enable a wide variety of plant personnel, trained and untrained, such as management during a strike, to perform the maintenance operations safely. The racking tool can be operated by a user without detailed training.

The racking tool can prevent explosions and fires from reaching an operator, because the operator can be located in a different room operating the racking tool remotely; thereby avoiding the dangers associated with arc flashing on change-outs. As such, the racking tool can allow a single circuit breaker to be shut down and replaced while an entire bus of circuit breakers remains live and operational. The racking tool can be used to save time and money during maintenance, as no power shut down is required.

The racking tool can be lightweight, such as from about 15 pounds to about 40 pounds, enabling men and women, strong and frail, to move and operate the racking tool.

The racking tool can be configured for use in small, tight places. For example, the racking tool can be about 12 inches long, 12 inches wide, and 12 inches deep, or even smaller.

The racking tool can have a motor mount plate. The motor mount plate can be a one-piece structure. The motor mount plate can be from about $1/16^{th}$ of an inch to about $1/4$ of an inch thick. The motor mount plate can be made of a lightweight metal plate, an aluminum plate, a steel plate, a stainless steel plate, a plate made of an alloy of steel, a graphite composite plate, a rigid plate, a reinforced polymer, a durable non-deformable polymer plate configured to withstand a temperature of at least 250 degrees Fahrenheit, high density polyethylene, high density polypropylene with reinforcing bars, or other polymers. The motor mount plate can be coated with a material that prevents the build up of an ionic charge.

In one or more embodiments, the motor mount plate can have a body plate with a width from about 2 inches to about 6 inches. One or two right angle supports made of plate steel can be used to reinforce the motor mount plate. For example, a lower support can be used to support the weight of the motor on the motor mount plate, and an upper support can be used to support the weight of the motor on the motor mount plate opposite the lower support. The lower support can extend from the body plate with a length from about 2 inches to about 8 inches. The upper support can extend from the body plate with a width less than or equal to the lower support, and a length less than the length of the lower support. The length of the upper support can be about 1 inch less than the length of the lower support. In one or more embodiments, the lower support, the upper support, and the motor mount plate can be a one-piece structure connected by welding. The upper and lower supports can be made from a tough, durable heat resistant polymer or composite, such as a high density polypropylene or a graphite composite.

A motor can be mounted or otherwise connected to the motor mount plate. The motor can be a variable speed motor.

A control bracket can be disposed between the motor and a motor control housing, providing engagement therebetween. The motor control housing can be in communication with the motor to provide power and control signals thereto.

The motor control housing can be secured to the control bracket. The motor control housing can include a motor control circuit board in communication with the motor via a power and signal cable or wirelessly. The motor control housing can include an interface plug for receiving and sending signals and power from a remote switch operator. At least one relay can be connected between the motor control circuit board and the interface plug. The motor control housing can enable the motor to operate at a slow speed or another designated speed.

In one or more embodiments, the motor control circuit board can be wirelessly connected to the motor, enabling wireless communication therebetween controllable from a remote wireless device, such as a cell phone or an easy to use push button device, such as a wireless device using radio frequencies, infrared frequencies, or ultra high frequencies. The remote wireless device can be connectable to the motor control circuit board through a network, such as the Internet, a local area network, a wide area network, or another global communication network.

The portable racking tool can be configured to be remotely operated by an operator outside of an arc flash zone using the remote switch operator. For example, the operator, while outside of the arc flash zone, can use the remote switch operator to send power and control signals to the motor control housing, which can then send the power and control signals to the motor.

The motor can be operatively and/or rotatably engaged with a gear box. The gear box can have a shaft housing with a gear box keyway. A rotatable shaft can be operatively engaged with the gear box. For example, the rotatable shaft can have a shaft keyway, and a key can be engaged in the shaft keyway. The shaft keyway can be engaged in the shaft housing, and the key can be engaged in the gear box keyway; allowing the gear box to operatively engage the rotatable shaft for rotating the rotatable shaft.

The rotatable shaft can extend through the motor mount plate and be mounted into the shaft housing. The gear box can be configured to rotate the rotatable shaft in a clockwise direction and in a counter clockwise direction. The rotatable shaft can be from 2 about inches to about 8 inches long, and can have a diameter that fits within the shaft housing. In one or more embodiments, the rotatable shaft can have a neutral position. The rotatable shaft can be from about 2 inches to about 8 inches in length, made of steel, and have a diameter that is configured to fit the gear box.

A torque limiting clutch can be connected to or otherwise operatively engaged with the shaft housing.

A coupling can be connected to or otherwise operatively engaged with the torque limiting clutch on one end of the coupling. Another end of the coupling can be connected to or otherwise operatively engaged with the electrical equipment. The coupling can be a socket. In embodiments, the lower support and upper support of the motor mount plate can extend from the motor mount plate at about a 90 degree angle to provide spacing for the coupling, which can be switched out for different sized couplings to perform different installations, removals, or testing.

A fastener plate can be attached to the motor mount plate. The fastener plate can have a top side, a first side, a second side, a third side, a fourth side, a firth side, and a sixth side.

A first alignment guide and a second alignment guide can be mounted to one end of the fastener plate. The alignment guides can touch the metal surface surrounding the electrical equipment. The alignment guides can each be made of an electrically insulating, non-deforming, lightweight, and impact resistant polymer.

A fastener bracket can be secured to the top side of the fastener plate. A fastener can be secured to the fastener bracket. The fastener can be electrically insulated. The fastener can be a locking fastener or the like. At least one adjustable removable connector can secure the locking fastener to the fastener bracket through at least one opening.

In one or more embodiments, the racking tool can have a handle mounted to the motor control housing. The handle can allow the operator to easily carry and position the racking tool. The handle can be made of a material that insulates the user from shock, such as plastic, reinforced composite, or rubber coated metal.

One or more embodiments relate to a system for racking electrical equipment that includes the portable racking tool and a power and signal supply apparatus, such as the remote operated switch.

The remote switch operator can include a housing with a body and a lid hinged to the body. The housing can be an explosion proof housing that can be watertight, such as one made from an impact resistant thermoplastic.

A first face plate and a second face plate can both be disposed within the housing. The face plates can be made from coated steel having a thickness of about ¼ of an inch.

A power plug can be engaged through the first face plate and configured to provide current from an outside source, which can be A/C or D/C.

A charger power supply can be disposed in the housing beneath the first face plate for receiving current from the outside source.

A power and signal plug can be configured to transmit power and control signals from the remote switch operator to the portable racking tool, such as to the motor control housing through a power and signal cord or cable, which can be retractable.

A battery can be disposed beneath the first face plate in the housing. A relay can be connected to the battery. A circuit board can be connected to the relay and the battery. The circuit board can include a microprocessor, a flash memory, and computer instructions.

The remote switch operator can include an install momentary push button engaged with the circuit board, a remove momentary push button engaged with the circuit board, and an on/off switch engaged with the circuit board for connecting or disconnecting the battery. The buttons and switches of the remote switch operator can allow the operator to control which power and control signals are sent to the racking tool.

A circuit breaker can be connected between the battery and the circuit board.

A current control module can be disposed in the second face plate and connected to the relay and to a transmitter/receiver.

A remote control device can be in communication with the transmitter/receiver for sending and receiving power and control signals to the transmitter/receiver. The remote control device can include an antennae for transmitting signals, a remote on-button, a remote off-button, a remote install button, a remote remove button, and an automatic shut off switch. For example, the remote on-button can be used to turn on the motor, the remote off-button can be used to turn off the motor, the remote install button can be used to rotate the rotatable shaft in a first direction, and the remote remove button can be used to rotate the rotatable shaft in a second direction. The automatic shut off switch can be used to disable the racking tool when the racking tool exceeds a preset amperage. The buttons and switches on the remote switch operator can be used to perform the same functions describe with respect to the remote control device. In one or more embodiments, the current controller can also include an automatic shut off switch for disabling the racking tool when the racking tool exceeds a preset amperage.

In one or more embodiments, the current controller can include a circuit board disposed on an aluminum plate with a membrane overlay, at least a one digital display, and a microprocessor with flash memory for comparing sensed data to a predetermined threshold.

On or more embodiments relate to a method for racking electrical equipment using the racking tool disclosed herein.

The method can include connecting a portable racking tool to a remote switch operator. For example, wired communication can be provided between the portable racking tool and the remote switch operator. Wireless communication can be used between a remote control device for the remote switch operator, allowing an operator to remain outside an arc flash zone while operating the portable racking tool.

The method can include setting a torque limiting clutch to a predetermined torque setting. For example, the torque setting can be set depending upon the particular application, as some applications require greater or lesser amounts of torque to install and/or remove certain pieces of electrical equipment.

The method can include aligning a coupling in the portable racking tool with the electrical equipment needing maintenance, removal, or installation.

For example, one or more alignment tools can be engaged with the gear box and/or the rotatable shaft. The alignment tool can be rotated by an operator, thereby rotating the coupling until the coupling is aligned with the piece of electrical equipment. As such, the coupling can be operatively engaged with piece of electrical equipment for rotating the piece of electrical equipment, and thereby installing or removing the piece of electrical equipment.

The method can include securing a motor mount plate to a metal surface enclosing the electrical equipment. For example, the motor mount can be secured to the metal surface by a fastener, such as a clip fastener. The motor mount plate can hold the torque limiting clutch and the motor.

The method can include setting a current controller in the remote switch operator to a predetermined amp setting.

The method can include flowing power through an interface plug of the motor control housing to the motor from the remote switch operator to provide power and control signals thereto.

The method can include rotating the coupling with the motor to remove or install the electrical equipment while an operator is remote to the portable racking tool.

Figure 1A:
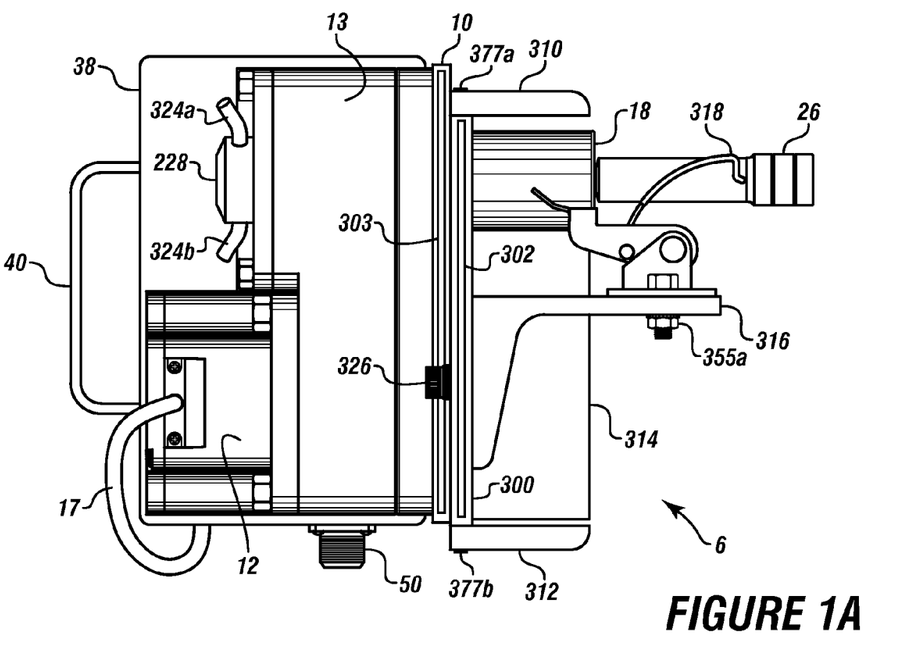
FIGS. 1A-1B depict side views of a portable racking tool.
Figure 1B:
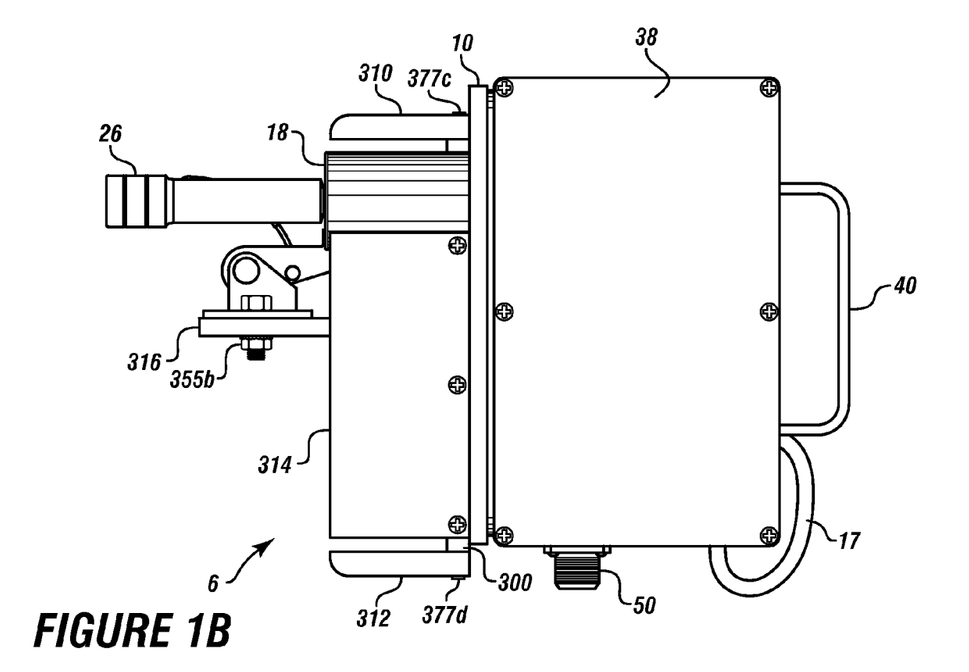

Turning now to the figures, FIG. 1A depicts a first side view of the portable racking tool 6, and FIG. 1B depicts a second side view of the portable racking tool 6, which can be used to remove or install electrical equipment surrounded by a metal surface.

The portable racking tool 6 can include a motor mount plate 10. A motor 12 can be mounted to the motor mount plate 10. The motor 12 can be a 24 volt DC motor available from Oriental Motor USA Corp. of Los Angeles, Calif., such as part number BLH5100KC. The motor 12 can be rotatably or otherwise operatively engaged with a gear box 13. The gear box 13 can be one available from Oriental Motors USA Corp. of Los Angeles, Calif., such as part number 200FR.

The gear box 13 can be operatively engaged with a torque limiting clutch 18. The torque limiting clutch 18 can be one available from Perf-A-Torque of Massachusetts.

A coupling 26 can be connected to or otherwise operatively engaged with the torque limiting clutch 18 on one end. The other end of the coupling 26 can operatively engage the electrical equipment. The coupling 26 can be one made by CBS Arcsafe, Inc. of Denton, Tex.

The motor 12 can be in communication with a motor control housing 38, such as through a power and signal cable 17. The motor control housing 38 can be aluminum, such as one available from Allied Electronics of Fort Worth Tex., or one manufactured by Hammon.

The motor control housing 38 can have a removable top, a bottom, and connected sides, forming a box.

In operation, an operator can use a handle 40 attached to the motor control housing 38 to carry the portable racking tool 6 to the electrical equipment.

A fastener 318 on a fastener bracket 316 can be used to engage the portable racking tool 6 with a portion of the electrical equipment to be operated upon, such as with the metal surface.

The fastener bracket 316 can be an L-shaped bracket with a length from about 2 inches to about 4 inches, a width from about 2 inches to about 3 inches, and a thickness from about ¼ of an inch to about ¾ of an inch. The fastener bracket 316 can be made of stainless steel plate. The fastener bracket 316 can have at least one hole or up to six holes for connecting the fastener 318 to the fastener bracket 316 with attachment fasteners, such as bolts.

For example, the fastener 318 can engage a portion of the electrical equipment by clipping to the electrical equipment. The fastener 318 can be a latching fastener with a lock, such as one available from McMaster Carr of Texas. The fastener 318 can be attached to the fastener bracket 316 with attachment fasteners 355a and 355b, such as screws, bolts, or the like.

The fastener bracket 316 can be connected to a fastener plate 300.

The fastener plate 300 can connect flush with the motor mount plate 10. The fastener plate 300 can be made of stainless steel, and can have a length from about 4 inches to about 8 inches, a width from about 4 inches to about 8 inches, and a thickness from about ⅛ of an inch to about ¾ of an inch.

In one or more embodiments, the motor mount plate 10 and the fastener plate 300 can both be made of hollow aluminum or hollow steel, and can be formed with channels, including side channels, top channels, and bottom channels. The channels can allow for secure and sliding attachment of various components to the motor mount plate 10 and fastener plate 300. For example, the motor mount plate 10 can have a motor side channel 303, and the fastener plate 300 can have a fastener side channel 302.

A first alignment guide 310, a second alignment guide 312, and a third alignment guide 314 can connect to the fastener plate 300. The alignment guides 310, 312, and 314 can be connected with fastening means 377a, 377b, 377c, and 377d. The alignment guides 310, 312, and 314 can each touch or engage a portion of the electrical equipment and/or the metal surface; providing a stable and aligned engagement between the portable racking tool 6 and the electrical equipment.

Each alignment guide 310, 312, and 314 can be made from plastic, or from plate or hollow aluminum. In embodiments, two of the alignment guides can be made of Delrin plastic, with the remaining alignment guide being made of aluminum. The alignment guides 310, 312, and 314 can each have a length ranging from about 2 inches to about 4 inches, a width ranging from about 1 inch to about 3 inches, and a thickness ranging from about ⅛ of an inch to about ½ of an inch.

In operation, the portable racking tool 6 can be engage with a portion of the electrical equipment and/or with the metal surface using an alignment device 228.

The alignment device 228 can have two ears 324a and 324b. The two ears 324a and 324b can be used to rotate the alignment device 228 to axially align the coupling 26 with the circuit breaker to be operated upon. The alignment device 228 can be operatively engaged with a rotatable shaft, and thereby with the torque limiting clutch 18 and the coupling 26.

The rotation of the alignment guide 228 can be used to rotate the coupling 26 until the coupling 26 is aligned with and engaged with the electrical equipment, such that the coupling 26 can be rotated for installation and/or removal of circuit breakers.

In operation, a user can send power and control signals from a remote switch operator, through an interface plug 50 on the motor control housing 38.

The motor control housing 38 can transmit the power and control signals to the motor 12 through the power and signal cable 17. The motor 12 can operate the gear box 13 to rotate the rotatable shaft, and thereby rotate the coupling 26 to install or remove portions of the electrical equipment.

The portable racking tool 6 can also include an adjustment device 326 on the fastener plate 300 to allow slidable adjustment and locking of the fastener bracket 316 along the fastener plate 300. The adjustment device 326 can be a rotatable tightening device which can be spring loaded, or a tightening screw.

For example, the adjustment device 326 can be loosened to allow the fastener bracket 316 to slide along the fastener plate 300 to a desired position for engagement with the electrical equipment or the metal surface. The adjustment device 326 can then be tightened to secure the fastener bracket 316 at the desired position on the fastener plate 300. The adjustment device 326 can have a threaded shaft connected to a larger head with texture. The threaded shaft can fit into a channel, and the head can enable easy use by an operator using a finger to tighten and loosen the adjustment device 326.

Figure 2A:
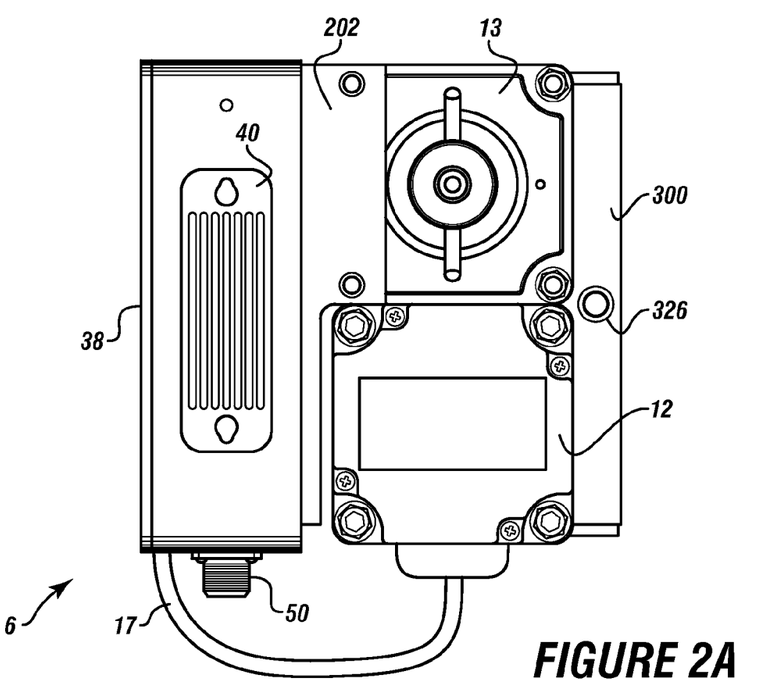
FIGS. 2A-2B depict front and back views of the portable racking tool.
Figure 2B:
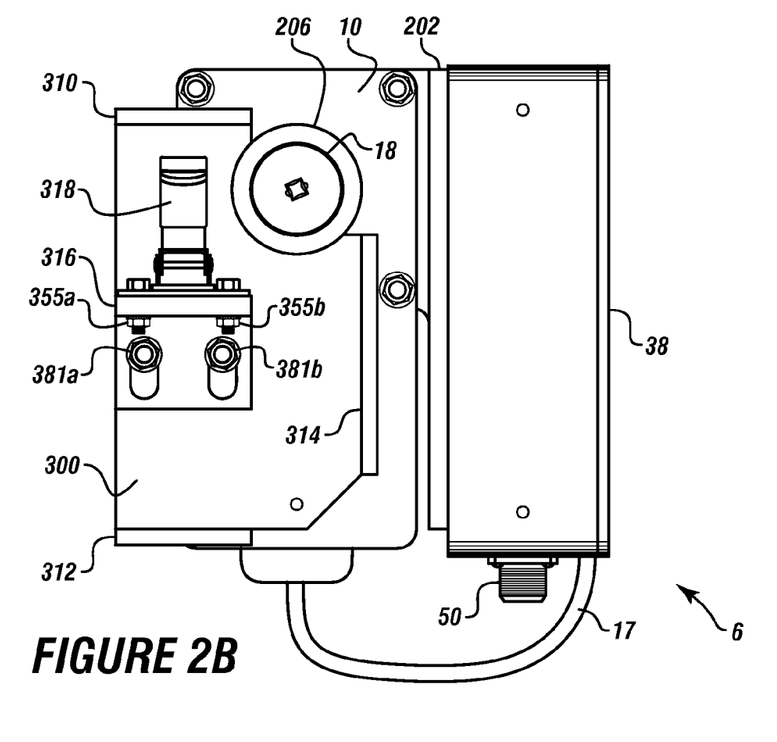

FIG. 2A depicts a back view of the portable racking tool 6, and FIG. 2B depicts a front view of the portable racking tool 6.

The portable racking tool 6 can include a control bracket 202 that can connect the motor control housing 38 to the gear box 13. The control bracket 202 can be about 4 inches wide by about 4 inches long, and have a thickness from about ⅛ of an inch to about ½ of an inch.

The control bracket 202 can be made of stainless steel, aluminum plate, or a non-deforming tough plastic.

The motor 12 can be secured to the motor control mount 10 with bolts or other removable fasteners, and can also be connected to the motor control housing 38 with bolts or other removable fasteners. The motor 12 can be in communication with the motor control housing 38 through the power and signal cable 17. The handle 40 and the interface plug 50 can both be attached to the motor control housing 38.

The fastener 318 can be connected to the fastener bracket 316 with attachment fasteners 355a and 355b. The fastener bracket 316 can be connected to the fastener plate 300 with attachment means 381a and 381b, which can be removable nuts and bolts.

The portable racking tool 6 can be modular, with individual parts being completely removable, enabling parts of the portable racking tool 6 to be easily replaced without having to replace the entire portable racking tool 6.

The portable racking tool 6 can be reconfigurable, as the parts can be re-oriented based on the shape of the electrical equipment; allowing for versatility of the portable racking tool 6.

The torque limiting clutch 18 can extend through a hole 206 in the motor mount plate 10. The hole 206 can have a diameter from about 1 inch to about 3 inches.

The adjustment device 326 is depicted along with the first alignment guide 310, the second alignment guide 312, and the third alignment guide 314.

Figure 3A:
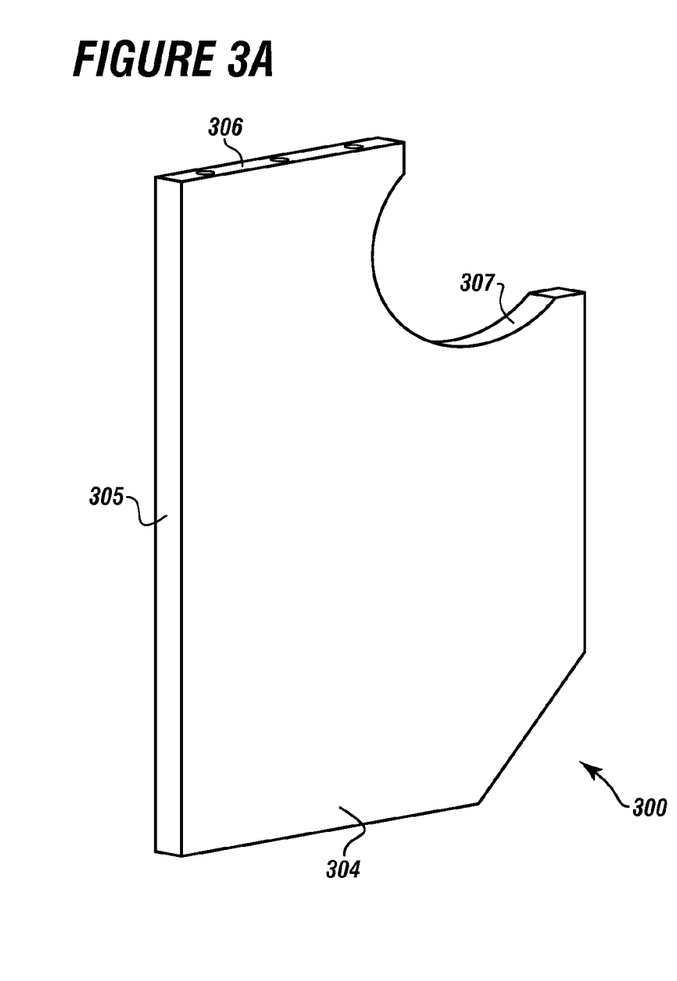
FIGS. 3A-3B depict detailed views of a fastener plate of the portable racking tool.
Figure 3B:
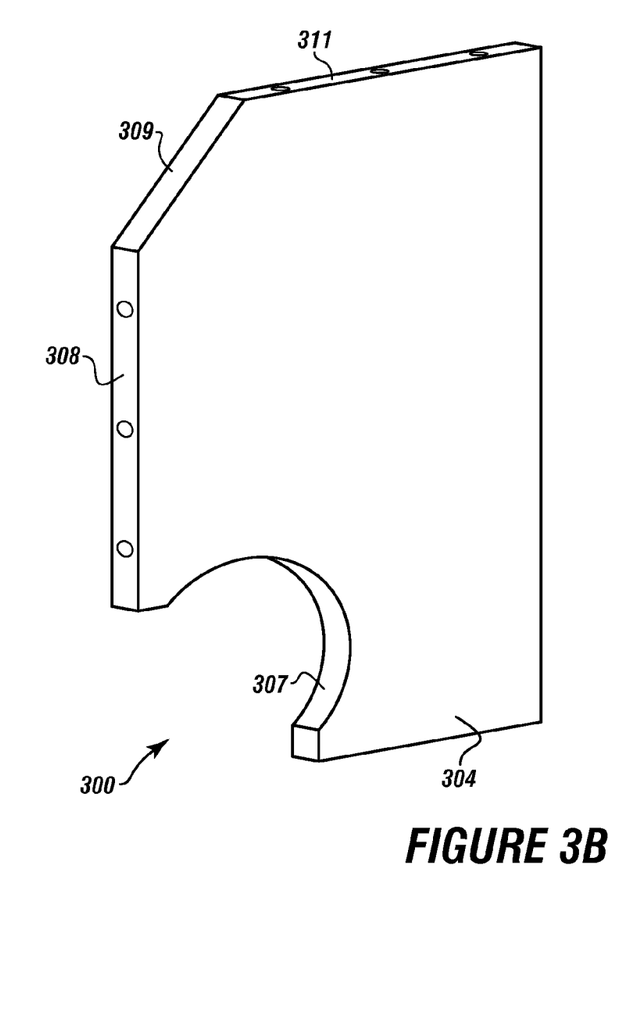

FIGS. 3A-3B depict an embodiment of the fastener plate 300.

The fastener plate 300 can have a top side 304 and a bottom side (not shown) opposite the top side 304. The fastener plate 300 can have a first side 305, a second side 306, a third side 307, a fourth side 308, a fifth side 309, and a sixth side 311.

The third side 307 can have a semicircular shape configured to fit around the hole in the motor mount plate; allowing for free rotation of the rotatable shaft and the torque limiting clutch.

The fastener plate 300 can be made of ¼ inch thick aluminum plate, and can have a length and width each ranging from about 3 inches to about 18 inches, depending on the size of the electrical equipment to be operated upon.

The fastener plate 300 can have an antistatic coating to inhibit static build up during operation to protect and operator.

Figure 4A:
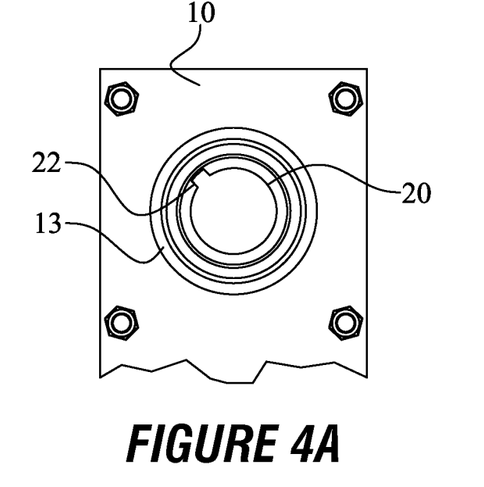
FIGS. 4A-4B depict a rotatable shaft and a gear box of the portable racking tool that can be operatively engaged with one another.

FIG. 4A depicts an embodiment of the motor mount plate 10 secured to the gear box 13. The gear box 13 can have a shaft housing 20 with a gear box keyway 22.

Figure 4B:
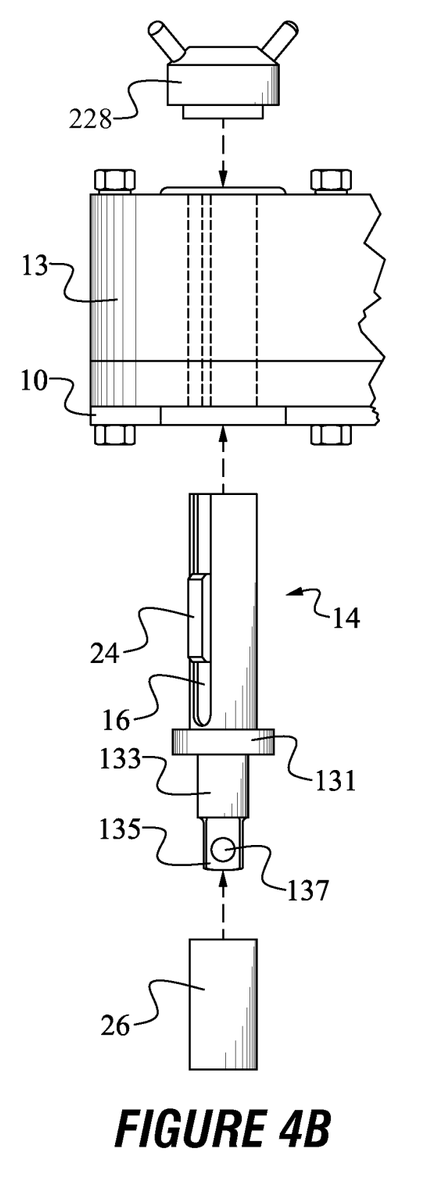

FIG. 4B depicts an assembly view of the gear box 13 on the motor mount plate 10, and the rotatable shaft 14.

Referring to FIGS. 4A-4B, the coupling 26 can engage electrical equipment at one end. The coupling 26 can operatively engage with the rotatable shaft 14. For example, the coupling 26 can engage an extension 135 of a collar 133 having a locking mechanism 137. The collar 133 can have a stop 131.

The coupling 26 can have a diameter that corresponds to the circuit breaker, and a length from about 1 inch to about 12 inches. The extension 135 can have a length from about ½ of an inch to about 1 inch. The collar 133 can have a length from about ½ of an inch to about 1 inch. The stop 131 can have a diameter from about ½ of an inch to about 1 inch. The extension 135 can be square shaped. The collar 133 can be circular. The stop 131 can have a diameter that is about 25 percent larger than a diameter of the collar 133.

The rotatable shaft 14 can have a shaft keyway 16 with a key 24. The shaft keyway 16 can be up to about 70 percent the length of the rotatable shaft 14.

The key 24 can have a length ranging from about ½ of an inch to about 1 inch, and a thickness of about ⅛ of an inch for fitting into the shaft keyway 16.

The rotatable shaft 14 can engage the shaft housing 20 of the gear box 13, and the key 24 can engage the gear box keyway 22.

The alignment device 228 can engage the rotatable shaft 14 within the gear box 13. The alignment device 228 can be used to rotate the rotatable shaft 14 to align the coupling 26 with a portion of electrical equipment. As such, the coupling 26 can operatively engage and rotate the portion of electrical equipment to install and/or remove the portion of electrical equipment.

Figure 5:
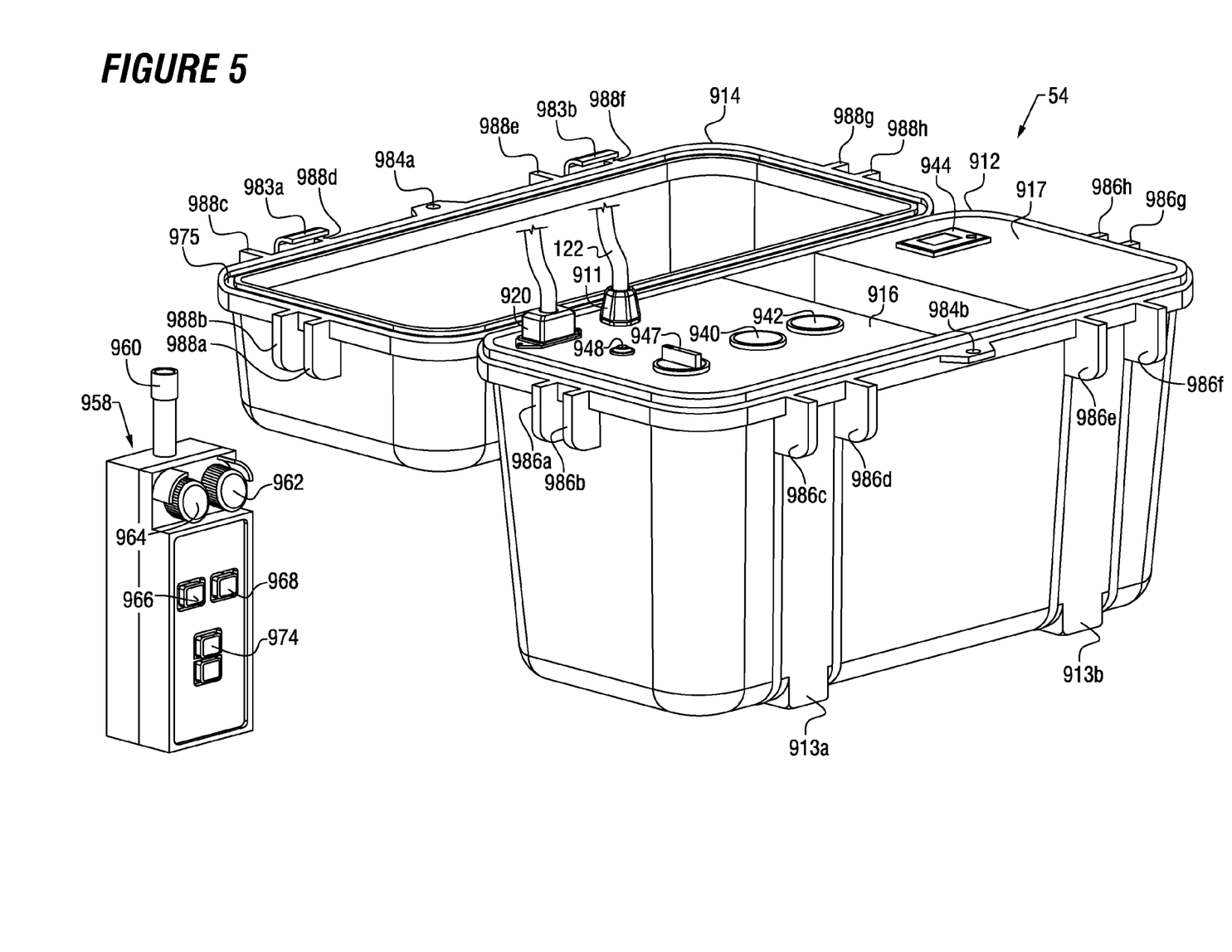
FIG. 5 depicts a remote switch operator usable with the portable racking tool.

FIG. 5 depicts an embodiment of a remote switch operator 54. The remote switch operator 54 can be used to remotely operate the portable motorized racking tool. The remote switch operator 54 can have a body 912 and a lid 914, which can be opened and closed over the body 912.

The body 912 can have one or more body ribs 986a, 986b, 986c, 986d, 986e, 986f, 986g, and 986h that can provide support for the body 912.

The body 912 can have one or more feet 913a and 913b that can provide clearance from the ground if the housing is placed near water or other substances.

The lid 914 can have one or more lid ribs 988a, 988b, 988c, 988d, 988e, 988f, 988g, and 988h that can provide support to the lid 914.

The lid 914 can have one or more latches 983a and 983b that can be used to hold the lid 914 to the body 912.

Connectors 984a and 984b can be used to lock the lid 914 to the body 912.

The lid 914 can have a groove 975 that can retain a sealing member, such as an elastomeric gasket, to provide a sealed engagement between the lid 914 and the body 912.

A first face plate 916 and a second face plate 917 can be mounted within the body 912.

The first face plate 916 can have a remove momentary push button 942, an install momentary push button 940, an on/off switch 947, and a circuit breaker 948.

The first face plate 916 can also have a power plug 920, and a power and signal plug 911 in communication with a power cord 122. The power and signal plug 911 can transmit power and signals from the remote switch operator 54 to the portable racking tool.

The second face plate 917 can support a current control module 944.

A remote control device 958 with a remote off-button 964, a remote on-button 962, a remote install button 966, a remote remove button 968, an automatic shut off switch 974, and an antenna 960 can be used by operators to remotely control the remote switch operator 54 and the portable racking tool outside of an arc flash zone.

The automatic shut off switch 974 can disable the portable racking tool when the portable racking tool exceeds a preset amperage.

Figure 6:
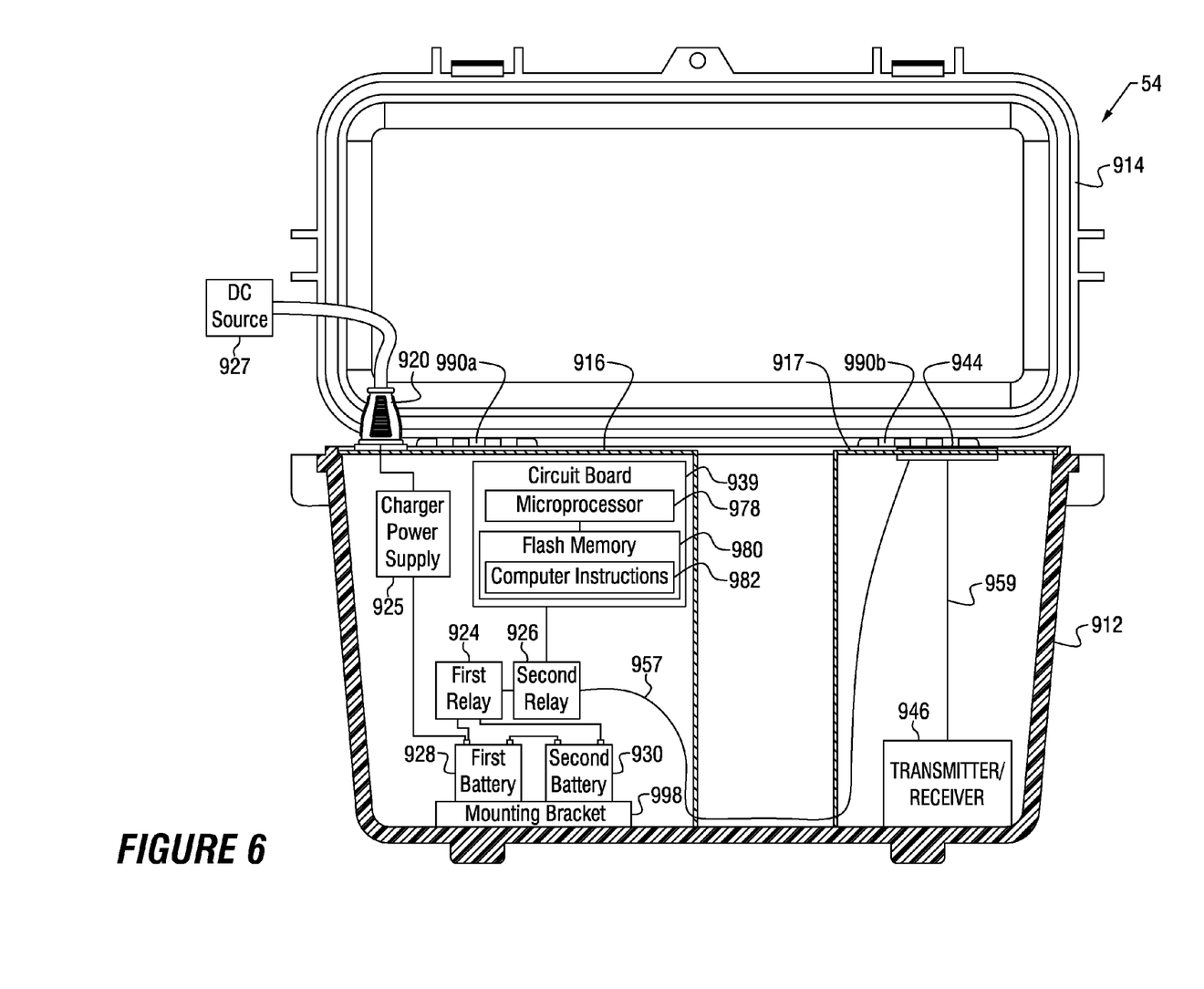
FIG. 6 depicts a diagram of components of the remote switch operator.

FIG. 6 depicts a cutaway view of the remote switch operator 54. The lid 914 is depicted opened relative to the body 912 with one or more hinges 990a and 990b.

A transmitter/receiver 946 can transmit or receive signals from the remote control device, which can be a radio controller. The transmitter/receiver 946 can be in communication with the current control module 944 on the second plate 917 through a first cable 959.

The current control module 944 can be in communication with a second relay 926 through a second cable 957. As such, the current control module 944 can send electricity and signals from the transmitter/receiver 946 to the second relay 926.

The second relay 926 can be in communication with a circuit board 939. The circuit board 939 can have a microprocessor 978, and a flash memory 980 with computer instructions 982.

The second rely 946 can send electricity and signals from the transmitter/receiver 946 to the circuit board 939. The circuit board 939 can control the various electrical components under the first face plate 916. For example, the circuit board 939 can control the buttons on the first face plate 916, such as for increasing or decreasing an amperage.

In one or more embodiments, the computer instructions 982 can provide instructions to monitor the current passing through the remote switch operator 54. The computer instructions 982 can also contain preset amperage limits for automatic shut off of the motor on the portable racking tool.

The second relay 926 can be in communication with a first relay 924. The second rely 946 can send electricity and signals from the transmitter/receiver 946 to the first relay 924.

The first relay 924 can be in communication with a first battery 928 and a second battery 930 for sending electricity and signals from the transmitter/receiver 946 to the first battery 928 and the second battery 930. The first battery 928 and the second battery 930 can be in communication with each other, and can both be mounted to a mounting bracket 998.

The first battery 928 can be in communication with a charger power supply 925, which can be in communication with a DC source 927 through the power plug 920 for providing up to 27 volts to charge the first battery 928 and the second battery 930. The first battery 928 and the second 930 can be 12 volt batteries.

Figure 7:
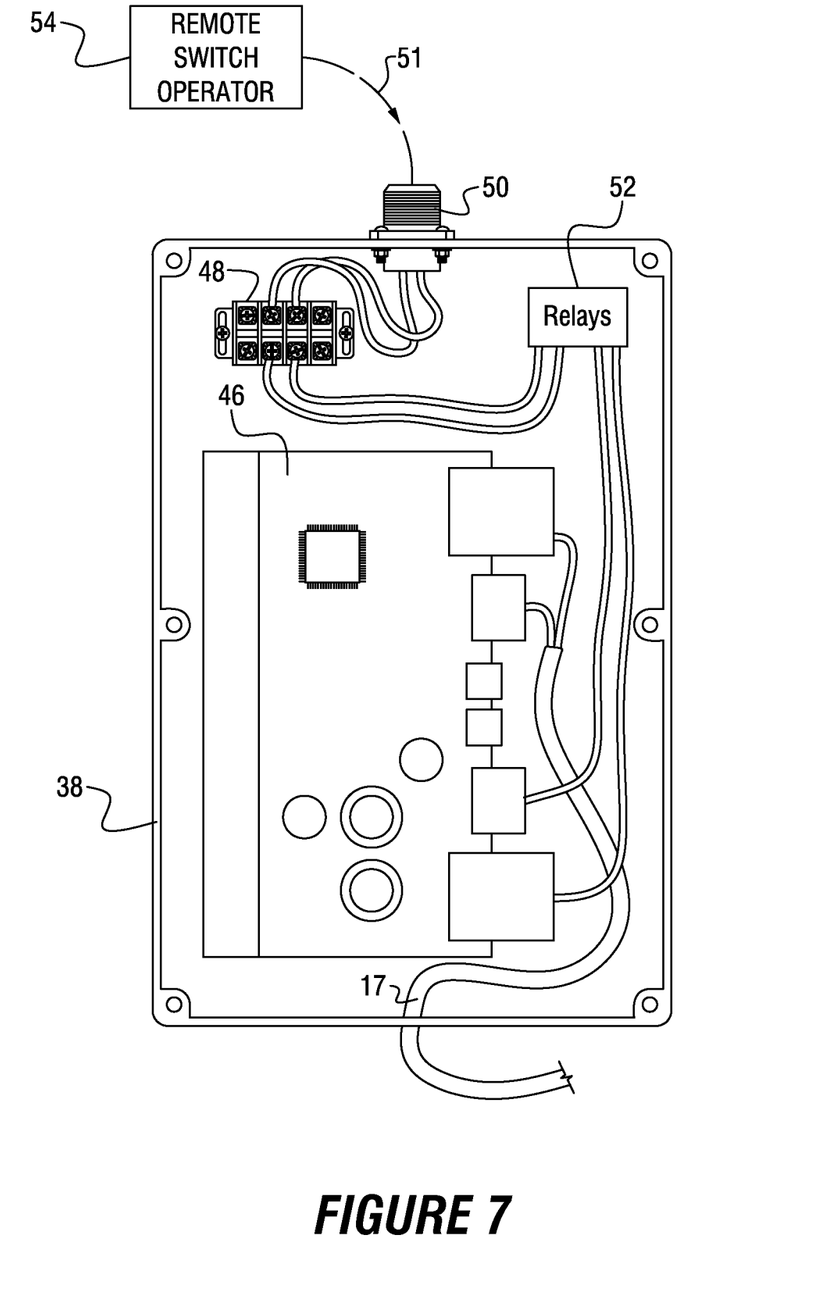
FIG. 7 depicts a detail of a motor control housing of the portable racking tool.

FIG. 7 depicts an embodiment of the motor control housing 38, which can be made of aluminum or another lightweight metal alloy. The motor control housing 38 can have a back, four sides, and a removable top, which can be connected together.

The motor control housing 38 can receive the power and control signals 51 from a power supply, which can be the remote switch operator 54. The power and control signals 51 from the remote switch operator 54 can be received through the interface plug 50.

Current can flow from the interface plug 50, through the electrical connectors 48, through the motor relays 52, and to the motor control circuit board 46.

The power and signal cord 17 can communicate the power and control signals 51 from the motor control circuit board 46 to the motor.

Figure 8:
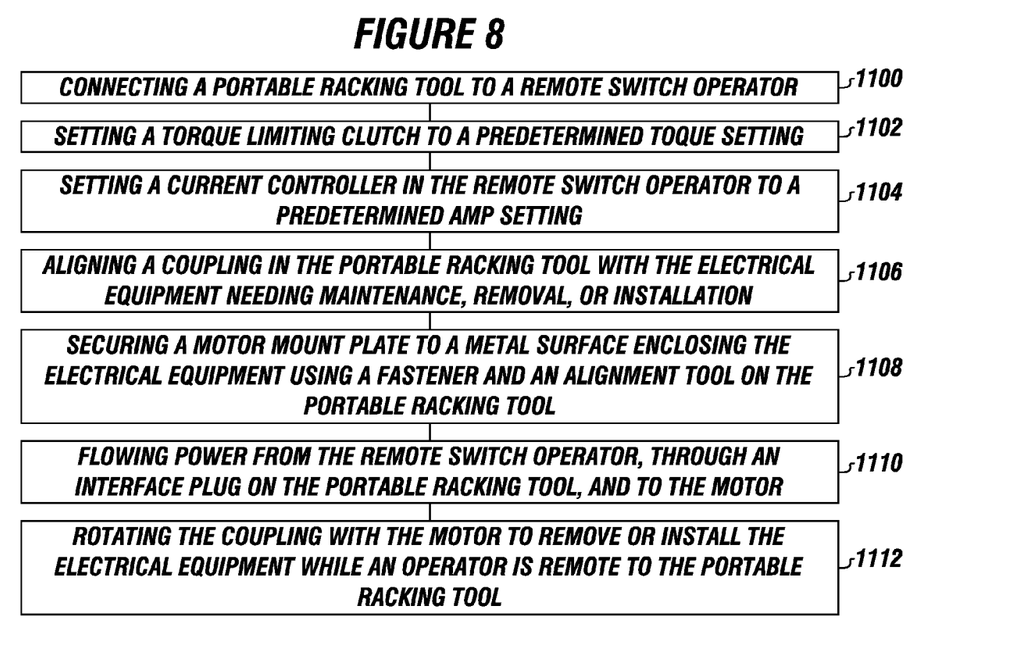
FIG. 8 depicts a diagram of an embodiment of a method of using the portable racking tool.

FIG. 8 depicts an embodiment of a method for racking electrical equipment.

The method can include connecting a portable racking tool to a remote switch operator, as illustrated by box 1100.

The method can include setting a torque limiting clutch to a predetermined toque setting, as illustrated by box 1102.

The method can include setting a current controller in the remote switch operator to a predetermined amp setting, as illustrated by box 1104.

The method can include aligning a coupling in the portable racking tool with the electrical equipment needing maintenance, removal, or installation, as illustrated by box 1106.

The method can include securing a motor mount plate flush to a metal surface enclosing the electrical equipment using a fastener and an alignment tool on the portable racking tool, as illustrated by box 1108.

The method can include flowing power from the remote switch operator, through an interface plug on the portable racking tool, and to the motor, as illustrated by box 1110.

The method can include rotating the coupling with the motor to remove or install the electrical equipment while an operator is remote to the portable racking tool, as illustrated by box 1112.

While these embodiments have been described with emphasis on the embodiments, it should be understood that within the scope of the appended claims, the embodiments might be practiced other than as specifically described herein.

What is claimed is:

1. A portable racking tool for removing or installing electrical equipment surrounded by a metal surface, wherein the portable racking tool comprises:
   a. a motor mount plate;
   b. a motor mounted to the motor mount plate and rotatably engaged with a gear box, wherein the gear box has a shaft housing with a gear box keyway;
   c. a control bracket disposed between the motor and a motor control housing, wherein the motor control housing is secured to the control bracket, and wherein the motor control housing comprises:
      (i) a motor control circuit board in communication with the motor via a power and signal cable;
      (ii) an interface plug for receiving and sending signals and power from a remote switch operator; and
      (iii) at least one relay connected between the motor control circuit board and the interface plug;
   d. a rotatable shaft with a shaft keyway having a key, wherein the rotatable shaft extends through the motor mount plate and is mounted into the shaft housing, wherein the key is engaged with the gear box keyway, and wherein the gear box is configured to rotate the rotatable shaft in a clockwise direction and in a counter clockwise direction;
   e. a torque limiting clutch connected to the shaft housing;
   f. a coupling connected to the torque limiting clutch on one end of the coupling, and connected to the electrical equipment on the other end of the coupling;
   g. a fastener plate attached to the motor mount plate comprising a top side, a first side, a second side, a third side, a fourth side, a firth side, and a sixth side;
   h. a first alignment guide and a second alignment guide mounted to one end of the fastener plate, wherein the first alignment guide and the second alignment guide touch the metal surface surrounding the electrical equipment;
   i. a fastener bracket secured to the top side of the fastener plate; and
   j. a fastener secured to the fastener bracket, wherein the portable racking tool is configured to be remotely operated by an operator outside of an arc flash zone using the remote switch operator.

2. The portable racking tool of claim 1, wherein the first alignment guide and the second alignment guide each comprise an electrically insulating, non-deforming, lightweight, and impact resistant polymer.

3. The portable racking tool of claim 1, wherein the electrical equipment is a low voltage circuit breaker, a medium voltage circuit breaker, a switch gear, a motor control center, or a contactor.

4. The portable racking tool of claim 1, wherein the fastener is electrically insulated.

5. The portable racking tool of claim 1, wherein the motor mount plate is made of a lightweight metal plate that is ¼ inch thick.

6. The portable racking tool of claim 5, wherein the lightweight metal is aluminum.

7. The portable racking tool of claim 1, wherein the motor mount plate is made of a plate selected from the group consisting of: a steel plate, a stainless steel plate, a plate made of an alloy of steel, a graphite composite plate, a rigid plate, and a durable non-deformable polymer plate configured to withstand a temperature of at least 250 degrees Fahrenheit, wherein the plate is from $1/16^{th}$ of an inch to ¼ of an inch thick.

8. The portable racking tool of claim 7, wherein the motor mount plate further comprises:
   a. a body plate with a width ranging from 2 inches to 6 inches;
   b. a lower support extending from the body plate with a length from 2 inches to 8 inches; and
   c. an upper support extending from the body plate with a width less than or equal to the lower support, and a length less than the length of the lower support.

9. The portable racking tool of claim 1, wherein the fastener is a locking fastener.

10. The portable racking tool of claim 9, further comprising at least one adjustable removable connector, wherein the at least one adjustable removable connector secures the locking fastener to the fastener bracket through at least one opening.

11. The portable racking tool of claim 1, wherein the rotatable shaft is from 2 inches to 8 inches long, and has a diameter that fits within the shaft housing.

12. The portable racking tool of claim 1, further comprising a handle mounted to the motor control housing.

13. The portable racking tool of claim 1, wherein the motor control circuit board is wirelessly connected to the motor.

14. The portable racking tool of claim 1, wherein the remote switch operator comprises:
   a. a housing with a body and a lid;
   b. a first face plate and a second face plate within the housing;
   c. a power plug in the first face plate configured to provide current and from an A/C or D/C outside source;
   d. a charger power supply in the housing beneath the first face plate for receiving current from the A/C or D/C outside source;
   e. a power and signal plug configured to transmit the signals and power to the portable racking tool using a power cord;
   f. a battery disposed beneath the first face plate in the housing;
   g. a relay connected to the battery;
   h. a circuit board connected to the relay and the battery, wherein the circuit board comprises a microprocessor, a flash memory, and computer instructions;
   i. an install momentary push button engaged with the circuit board;
   j. a remove momentary push button engaged with the circuit board;
   k. an on/off switch for connecting or disconnecting the battery;
   l. a circuit breaker connected between the battery and the circuit board;
   m. a current control module disposed in the second face plate and connected to the relay and a transmitter/receiver; and n. a remote control device for sending and receiving signals to the transmitter/receiver, wherein the remote control device comprises an antennae, a remote on-button, a remote off-button, a remote install button, a remote remove button, and an automatic shut off switch, and wherein the automatic shut off switch disables the portable racking tool when the portable racking tool exceeds a preset amperage.

15. The portable remote racking tool of claim 14, wherein the current controller further comprises an automatic shut off switch for disabling the portable racking tool when the portable racking tool exceeds a preset amperage.

16. A method for racking electrical equipment comprising:
   a. connecting a portable racking tool to a remote switch operator;
   b. setting a torque limiting clutch to a predetermined toque setting, wherein the torque limiting clutch is on a motor of the portable racking tool;
   c. setting a current controller in the remote switch operator to a predetermined amp setting;
   d. aligning a coupling of the portable racking tool with the electrical equipment, wherein the electrical equipment needs maintenance, removal, or installation, and wherein the coupling is connected to the torque limiting clutch and the motor;
   e. securing a motor mount plate to a metal surface enclosing the electrical equipment using a fastener on the portable racking tool, wherein the motor mount plate holds the torque limiting clutch and the motor;
   f. flowing power from the remote switch operator, through an interface plug on the portable racking tool, and to the motor; and
   g. rotating the coupling with the motor to remove or install the electrical equipment while an operator is remote from the portable racking tool.

\* \* \* \* \*